United States Patent [19] [11] 3,993,225
Manni [45] Nov. 23, 1976

[54] PORTABLE SPREADER FOR PARTICULATE MATERIAL

[75] Inventor: Mario Manni, Ossining, N.Y.

[73] Assignees: Mario Manni; Don Vizioli, both of Ossining, N.Y.; part interest to each

[22] Filed: Sept. 11, 1975

[21] Appl. No.: 612,569

[52] U.S. Cl. .............................. 222/324; 222/333; 222/470; 222/317; 239/687; 239/689; 239/653; 239/676
[51] Int. Cl.² ........................................ G01F 11/06
[58] Field of Search .......... 222/323, 324, 333, 410, 222/470, 314, 317, 472, 473; 239/681, 687, 688, 689, 653, 668, 669, 676

[56] References Cited
UNITED STATES PATENTS

| 2,331,380 | 10/1943 | Edey | 222/473 X |
| 2,961,129 | 11/1960 | Bullock | 222/323 X |
| 3,157,402 | 11/1964 | Love, Jr. | 239/689 X |

Primary Examiner—Allen N. Knowles
Attorney, Agent, or Firm—Daniel M. Rosen

[57] ABSTRACT

A unitary assembly has a housing for enclosing a drive, the housing including a handle, a cylindrical distribution chamber with a vertical axis and a slot directed away from the handle. A motor is mounted below the distribution chamber to rotate a rotor within the chamber, the rotor having vanes spaced from the center of the rotor. A hopper is removably mounted to the top of the distribution chamber. A control means is provided on the handle adjacent the side toward the distribution chamber for controlling the motor, and for controlling the flow of particulate material from the hopper into the distribution chamber.

14 Claims, 17 Drawing Figures

PORTABLE SPREADER FOR PARTICULATE MATERIAL

THE INVENTION

This invention relates to devices for spreading particulate material, and is more particularly directed to a portable assembly, which may be readily carried by an operator, for spreading particulate material, such as chemicals, fertilizer or seeds.

It is frequently desired, for example, in the home environment, to spread seeds, such as grass seeds, fertilizer or chemicals. While large equipment may be available for this purpose, such equipment is, of course, inaccessible and inconvenient for a home user. As a consequence, frequently the inaccurate hand distribution of particulate material is resorted to.

The present invention is directed to the provision of a completely portable hand-operated unit, whereby an operator may carry the entire unit to the area to which the particulate material is to be distributed, and readily and evenly distribute the material over the desired area.

Briefly stated, in accordance with the invention, a housing is provided having a handle at the top thereof, the housing being adapted to enclose a drive motor. A cylindrical distribution chamber is mounted at the front of the unit. The chamber having a vertical axis and a circumferential slot on the side thereof away from the handle. A motor is mounted near the distribution chamber and has a shaft connected to rotate a rotor within the distribution chamber. The rotor has radially extending vanes on its upper surface, it being particularly noted that the vanes do not extend to the center of the rotor, whereby there is at least a portion of the flat surface of the rotor between the vanes and the center of the rotor.

The distribution chamber has an aperture in its upper wall, and a funnel or hopper is removably affixed to the top of the distribution chamber, whereby particulate matter loaded in the hopper may drop downwardly to the center of the distribution chamber, and be cast by the vanes of the rotor through the slot at the front of the distribution chamber.

A valve means, such as a butterfly valve, a pair of D-shaped plates, or a simple lever, is provided in the hopper in order to control the rate at which material drops through the hopper into the distribution chamber. The control for the valve is positioned at the side of the handle toward the hopper, whereby it may be readily controlled by the finger of an operator during use. In addition, a control for the motor is also mounted on the same side of the handle, to enable the operator to turn the motor on and off, as well as to control the speed of the motor. For the latter purpose, a motor speed control circuit may be provided within the housing, Alternatively, valve and motor control may be combined.

It is of particular importance, in accordance with the invention, that the controls for the valve and the motor are located close to one another at the side of the handle, whereby the assembly is readily and easily operated with a minimum of effort.

The assembly in accordance with the invention is thus completely portable, and is well adapted for home use, whereby it provides means for readily and simply distributing particulate material over a desired area.

In order that the invention will be more clearly understood, it will now be described in greater detail with reference to the accompanying drawings, wherein.

Figures 1, 2, 3A:
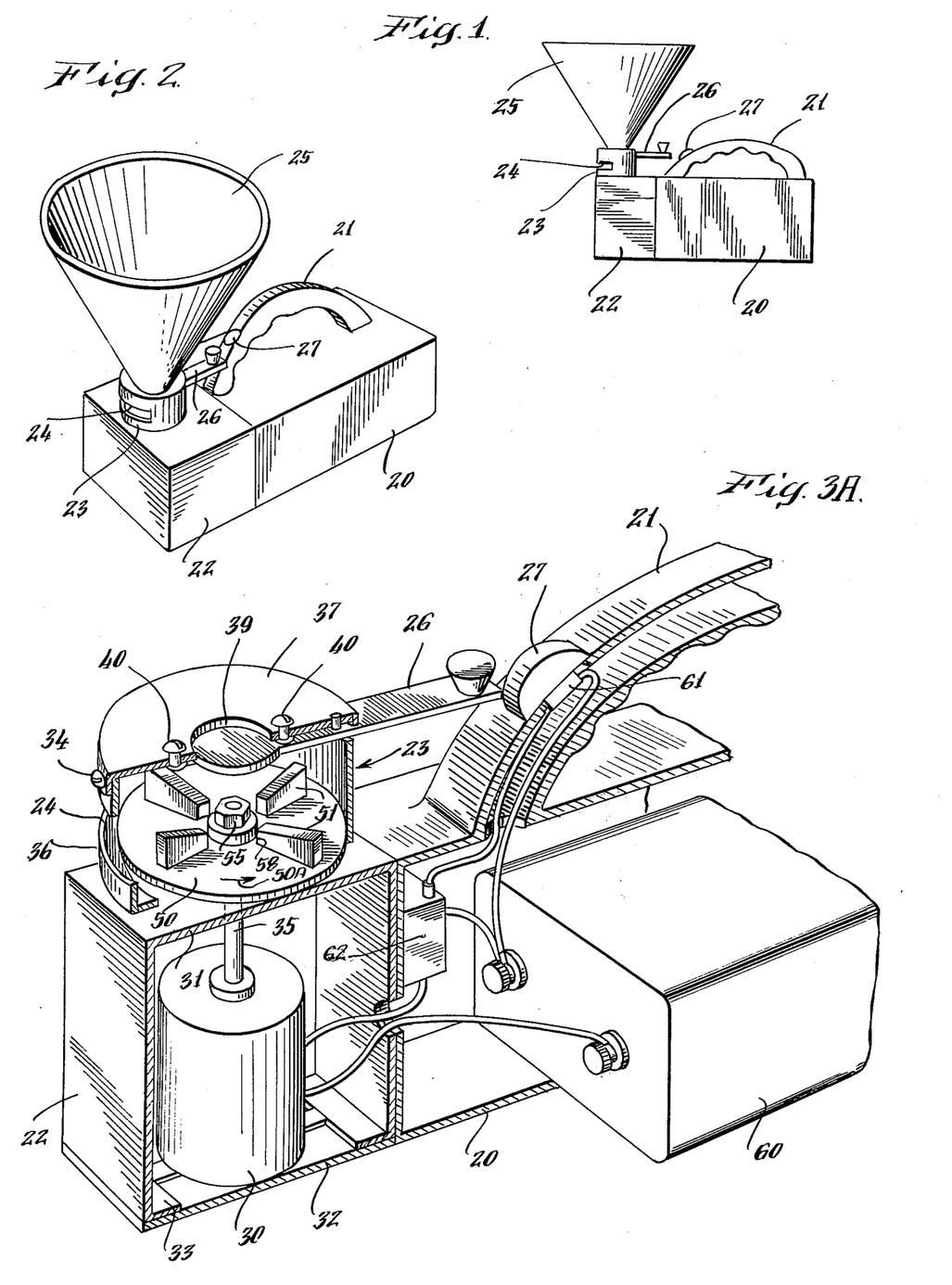
FIG. 1 is a simplified side view of a spreader in accordance with the invention.
FIG. 2 is a perspective view of the spreader of FIG. 1.
FIGS. 3A–D are perspective partially cross-sectional views of a portion of the spreader of FIG. 1, illustrating the internal components of the motor housing, handle, motor unit, and the distribution chamber, without the hopper in place.

Referring now to the drawings, FIGS. 1 and 2 illustrate a spreading device in accordance with one embodiment of the invention. The spreader includes a housing 20 having a handle 21 mounted on top of the housing. At the front end of the housing, or alternatively as a part thereof, is a front unit 22. As will be apparent in the following disclosure, in the battery operated unit, the housing 20 is adapted to contain batteries, and a motor having a vetical shaft is mounted in the unit 22. In the AC powered unit, the housing 20 is adapted to contain the motor, and the unit 22 contains driving mechanisms. A distribution chamber 23 is mounted on top of the unit 22, the chamber 23 being mounted spaced from one side of the handle 21. A circumferentially extending slot 24 is provided in the chamber 23, the slot 24 being directed away from the handle 21 and having an arc of from about 45° to 90°.

A funnel or hopper 25 is removably affixed to the top of the chamber 23. This hopper 25 has an internal valve controlled by a control arm 26 extending into the vicinity of the adjacent side of the handle 21. A control switch 27 is mounted on the same side of the handle 21. As will be apparent from the following description, an operator employing the spreader in accordance with the invention, holds the assembly in one hand by means of the handle 21, whereby with a simple finger control he may control the control switch 27 or the valve control lever 26. The control switch 27 and control lever 26 may be alternatively combined into one mechanism, as will be described later herein. The hopper 25 is adapted to be filled with a dry particulate material, such as seeds, fertilizer, or a chemical, and the particulate material will be directed outwardly of the unit through the slot 24, away from the operator.

Figure 4:
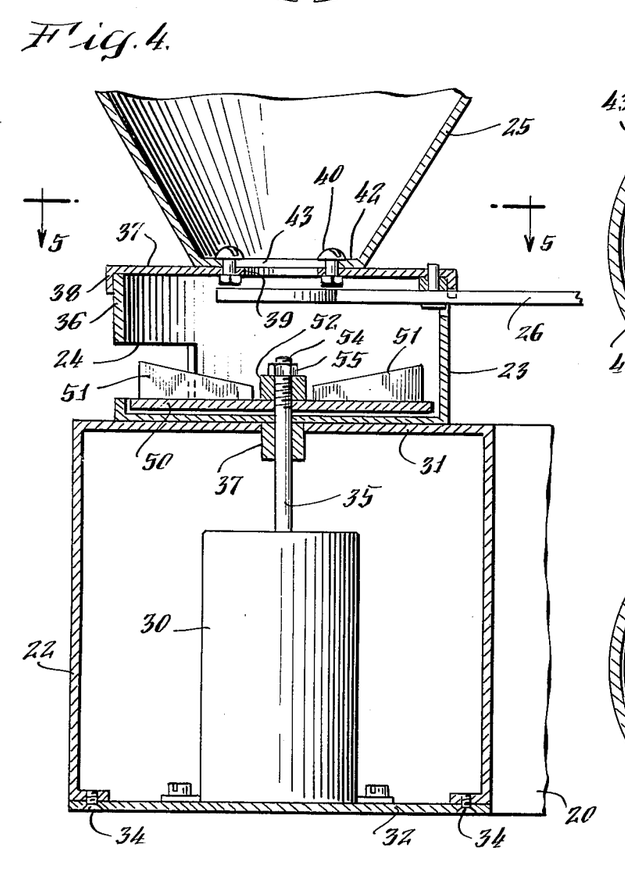
FIG. 4 is a cross-sectional view of a portion of the motor unit, distribution chamber, and a portion of the hopper of the spreader of FIG. 1.

Referring now to FIGS. 3A and 4, a DC motor 30 is mounted within the unit 22, with a shaft extending vertically through an aperture in the upper wall 31 of the unit 22. For example, the lower end of the motor may be fixed to a removable bottom 32 of the unit 22. For this purpose, the lower side walls of the unit 22 may have inwardly extending tabs 33, to which the lower wall may be held by self-tapping screws 34. In order to ensure proper alignment of the shaft 35 of the motor, a suitable bearing 36 may be provided on the upper wall 31. The distribution chamber 23 is mounted on top of the unit 22. This chamber has cylindrical side walls 36, with the circumferential slot 24 extending through the side wall 36. The top 37 of the chamber 23 may be removable. For example, the top 37 may be provided with a downwardly extending flanged rim 38, which may be suitably affixed, for example, by means of self-tapping screws 38A outside of the side walls 36. The top 37 is provided with a central aperture 39 aligned with the shaft 35, whereby particulate material can drop downwardly through the aperture 39 into the chamber 23.

Figure 5:
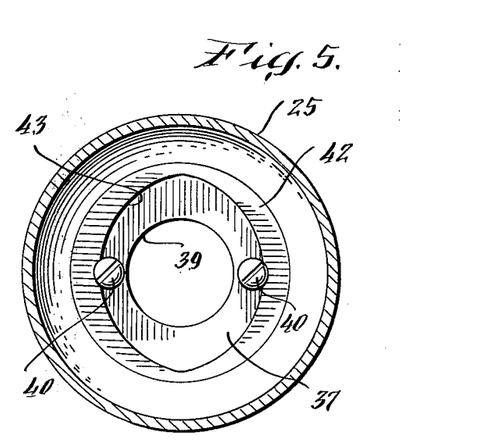
FIG. 5 is a partially cross-sectional top view of a preferred embodiment of the hopper and distribution chamber in accordance with the invention.
Figure 6:
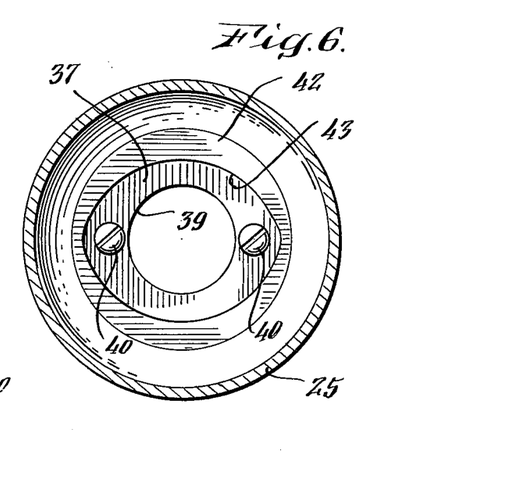
FIG. 6 is a partially cross-sectional view corresponding to that of FIG. 5, with the hopper rotated 90°.

A pair of pins 40 may be provided extending upwardly from the top wall 37 on opposite sides of the aperture 39. These pins preferably have enlarged heads. As illustrated in FIG. 4, the bottom of the hopper 24 may have a radially inwardly extending portion 42 having a central aperture 43 of elliptical shape, as illustrated in FIGS. 5 and 6. The major axis of the elliptical aperture 43 is longer than the maximum distance between the most remote extremeties of the pins 40, whereby the aperture may be fitted over the pins so that the bottom of the hopper engages the top wall 37 of the distribution chamber 23, as illustrated in FIG. 6. The inner diameter of the elliptical aperture 43 is essentially equal to the distance between the outer edges of the smaller shanks of the pins 40, so that, upon rotation of the hopper by 90° the edges of the portion 42 of the hopper will engage the pins 40 to lock the hopper in place, as illustrated in FIG. 5. This arrangement provides a simple and convenient manner for removably affixing the hopper 25 to the top of the distribution chamber.

Figures 3B, 3C, 3D:
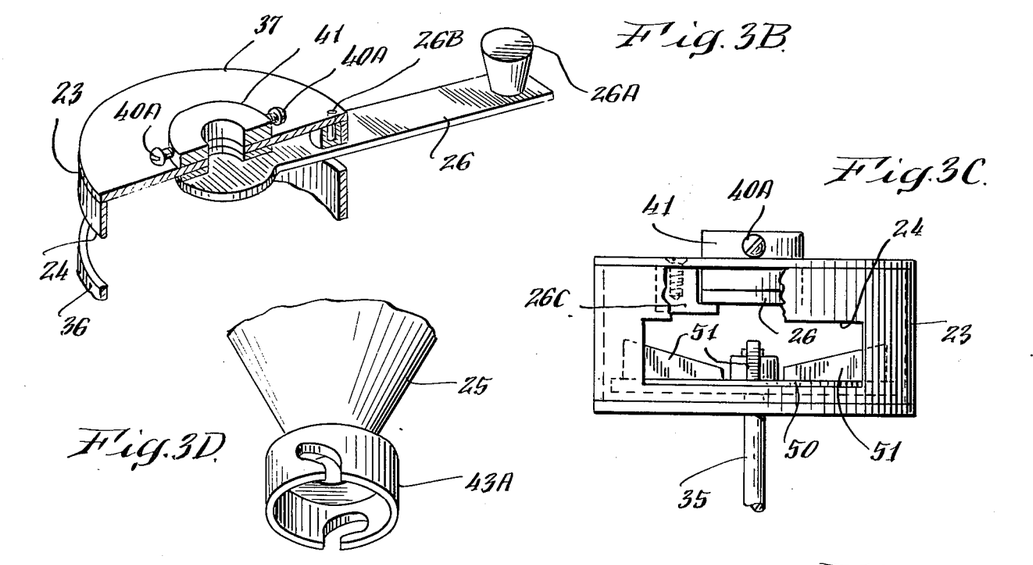

Alternatively, as shown in FIGS. 3B, 3C and 3D, the aperture 43 may be fitted over the collar area of the distribution chamber 23 by means of radially extending pins 40A extending from a collar ring 41 fixed over the top wall 37 of the distribution chamber 23. In this case, the aperture 43 of the hopper 25 is fitted with a cuff 43A (FIG. 3D) having suitably proportioned slots for accommodating the shafts of the pins 40A and for providing a friction fit effected by turning the collar 43A onto the shanks of pins 40A with the enlarged heads thereof positioned interior of the cuff. A firm seal can be provided by placing a rubber or other suitable material along the bottom edge of the cuff 43A. The collar 41 fits just within the interior diameter of the cuff 43A for completing the contact. Particulate material is allowed to drop through the collar 41 by varying the position of the control lever 26.

The valving of the material in the hopper is effected by a lever 26, controlled by a sideways movement of the protrusion 26A, causing the lever to pivot, via pivot pin 26B, thereby exposing the opening in collar 41 to the flow of particulate material. As shown in open end view (FIG. 3C), the lever 26 may coact with a fixed stop 26C to prevent movement past the center of the collar. The stop can frictionally engage the lever 26 to hold it in closed position.

Referring again to FIGS. 3A and 4, a rotor 50 is mounted on the upper end of the shaft 35 within the chamber 23. The rotor 50 has a diameter only slightly less than the inner diameter of the chamber 23, so that particulate matter cannot fall between the outer edges of the rotor 50 and the inner walls of the chamber 23. The rotor 50 is in the form of a flat disc, having a plurality of radially extending vanes 50 on its upper surface. While only four vanes are shown in FIG. 3, it will be apparent that more vanes may be provided if desired. In order to mount the rotor on the shaft, the rotor may have a threaded hub 52 adapted to be threaded on the threads 54 at the upper end of the shaft, and a lock nut 55 may be provided to hold the hub in place on the shaft. If desired, a spacing washer 56 may be provided between the rotor 50 and the bottom wall of the chamber 23. The top surface of the rotor 50 is substantially even with the lower edge of the circumferentially extending slot 24, so that particulate material may be cast from the top surface of the rotor out of the slot 24.

It is of particular importance that the radially inner edges 58 of the vanes 51 do not extend to the center of the rotor. In other words, the top surface of the rotor is free of obstructions in at least an annular portion thereof radially inwardly of the vanes 51. This is of importance, since it has been found that the particulate material is not effectively cast by the rotor if the vanes 51 extend to the center of the rotor.

Referring again to FIG. 3A, a conventional battery 60 is mounted by suitable means, such as spring clips (not shown) in the housing 20. The battery 60 may, for example, be of 6 volts or more. The handle 21 is hollow, and has an aperture 61 at the side thereof facing the distribution chamber 23. A switch 27 or variable speed control is mounted in the aperture 61 so that it may be readily controlled by one finger of an operator holding the handle 21. In order to provide for variable speed control of the motor, a variable speed control circuit 62 of conventional nature may be mounted within the housing 20. Suitable wires are thus provided connecting the battery 60, motor 30, control unit 62 and switch 27 to enable the operator to control the speed of the motor 30, and hence the rotational speed of the rotor 50. Consequently, the operator may control the speed of the rotor to provide the most effective casting of the particulate material. The motor 30, although shown as vertically mounted, may be horizontally mounted as well, using appropriate gearing or a flexible drive shaft. Direction of rotation is as shown by the arrow 50A.

Figures 7, 8, 13, 14:
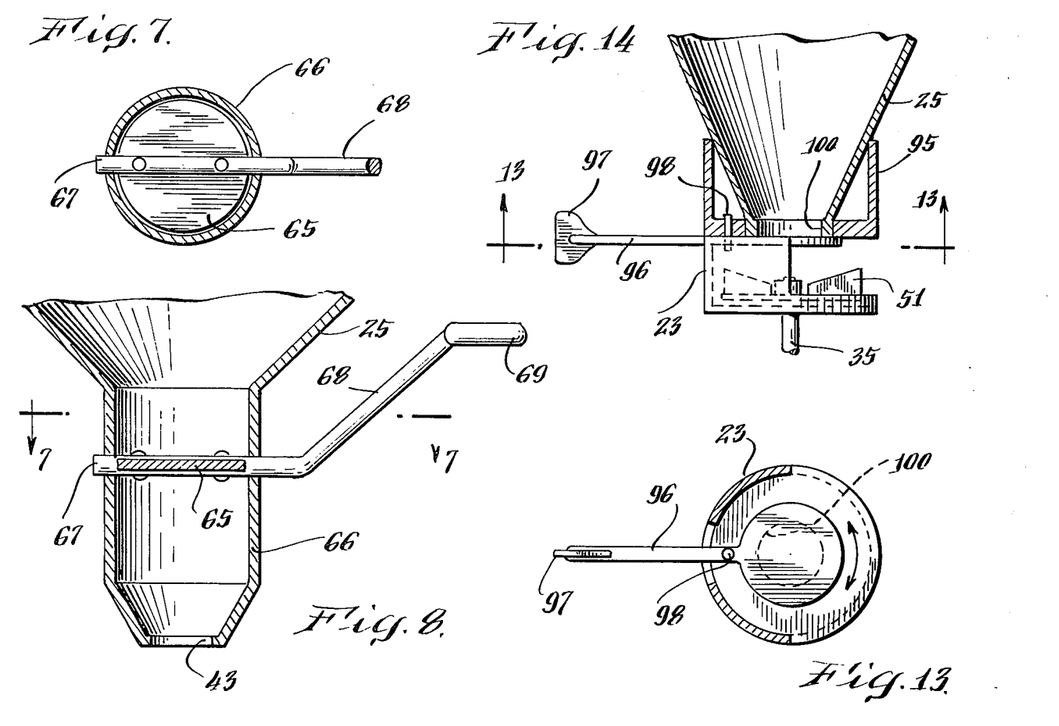
FIG. 7 is a simplified cross-sectional view of a hopper control valve in accordance with one embodiment of the invention.
FIG. 8 is a cross-sectional view of the hopper of FIG. 7 taken along the lines VIII — VIII.
FIG. 13 is a partially cross-sectional top view of a further valve controlling the hopper, in accordance with the invention.
FIG. 14 is a side view of the hopper of FIG. 13.

In another arrangement for controlling the descent of particulate material through the hopper and into the center of the dstribution chamber, as illustrated in FIGS. 7 and 8, a butterfly vane 65 is mounted in the hopper 25, for example, in a cylindrical portion 66 thereof adjacent the bottom. The shaft 67 of the butterfly vane 66 is supported in the side walls of the portion 66 of the hopper, and an operating handle 68 extends from one end of the shaft 67, the lever 68 having a terminal portion 69 positioned adjacent to the side of the handle 21, in the vicinity of the control 27, as illustrated in FIG. 1. Thus, the operator might employ one finger for operating the control 69, to rotate the butterfly vane 65, and hence control the rate at which particulate material drops through the bottom aperture 43 of the hopper.

Figure 9:
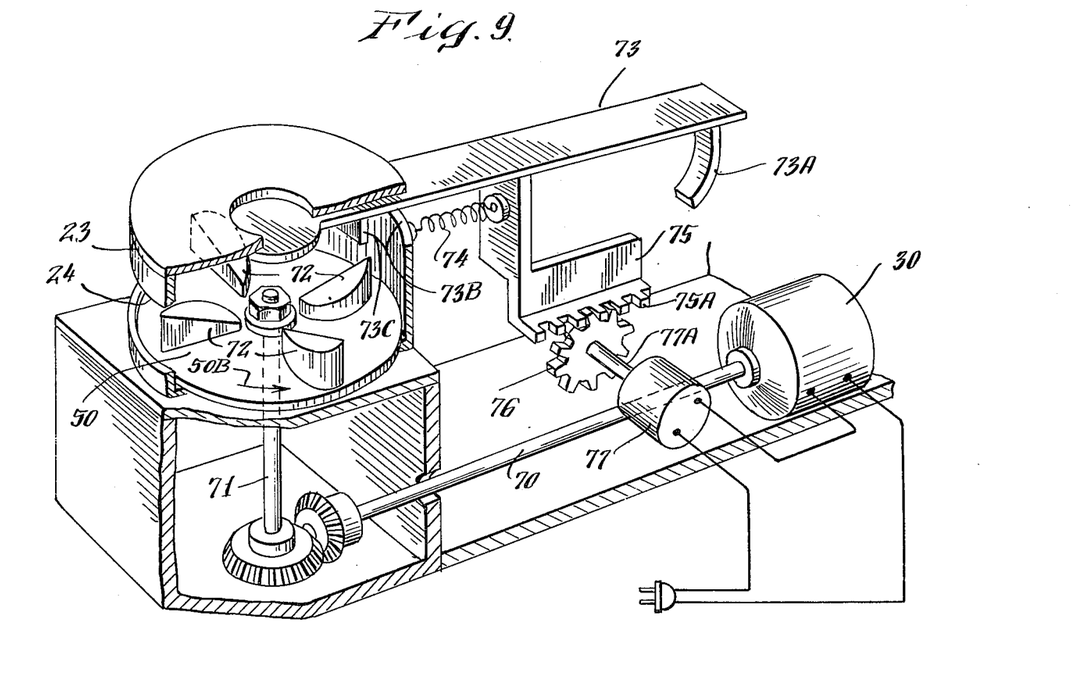
FIG. 9 is a partially cross-sectional side view of a further embodiment of the distributor, in accordance with the invention.
Figure 10:
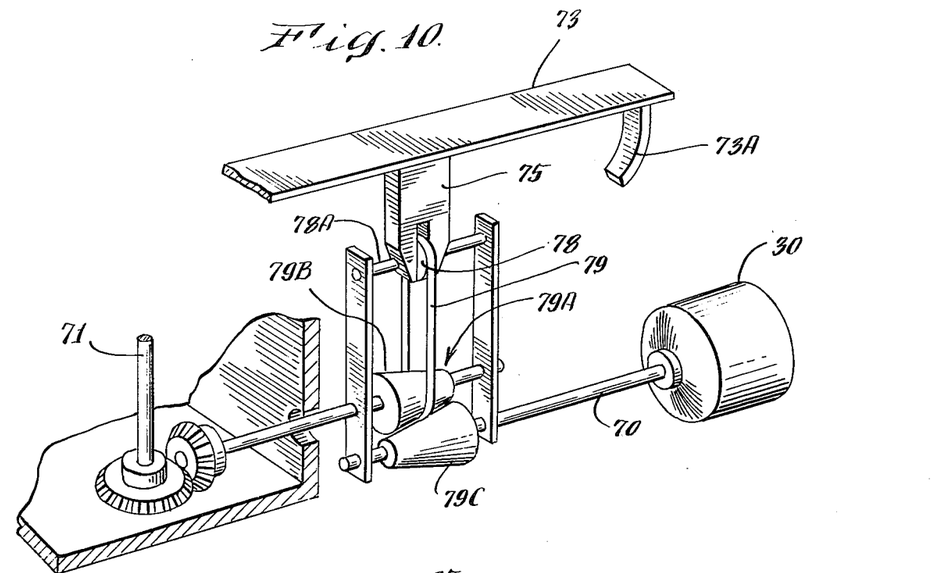
FIG. 10 is a partially cross-sectional side view of a further embodiment of the distributor, in accordance with the invention.

In a further embodiment of the invention, as illustrated in FIGS. 9 and 10, a single lever control for synchronizing both motor speed and material flow is provided. In this embodiment, the motor 30 is mounted horizontally, and operates through right angle geared shaft 70, 71 to drive the rotor 50. The vanes 72 are arranged in this embodiment to be shaped as "D's", with an elevation rising from the inner portion of the rotor 50. This shaping has been found to impart greater efficiency of particle cast from the chamber 23. For control, the lever 73 is provided with a pistol grip 73A and passes through the slot 73B and U-bracket 73C to position itself beneath the central aperture 39 in the top of the chamber 23. A steel coil spring 74, which may be enclosed in a suitable rubber or telescoping housing (not shown) maintains the lever 73 in the closes position as shown. Coupled to the lever 73 is a bracket 75 having a lower toothed section 75A cooperating with a similarly pitched toothed gear 76. The toothed gear is in turn coupled to rotate a variable speed control 77 through the shaft 77A to control the speed of the motor 30. The speed control 77 may be an SCR speed control, or a rheostat or a variable resistance or potentiometer of suitable power handling capability. Accordingly, the motor 30, while shown as being adapted to be coupled to an AC source, may be battery operated as described in FIG. 3A.

In operation, the speed control is set such that in rest position, as shown, the motor is not turning. When the pistol grip 73A is pulled back (to the right as shown) the particulate matter drops through the central aperture 39, and at the same time the gearing 75A–76 rotates the speed control causing the motor to revolve, rotating the rotor 50, in the direction 50B, and casting the particles out of the chamber 23. As the pull on the lever 73 increases, and more particulate material falls through the aperture 39, the speed of the motor 30 increases due to the corresponding rotation of the speed control 77. Thus, as the flow of material increases, so does the speed of the rotor, thereby increasing the cast of the material. As a result, a relatively constant density of material over a predetermined range can be achieved. In addition, a one finger control for both motor speed and material flow is thus realized.

A mechanical alternative to FIG. 9 is shown in FIG. 10 wherein the speed control is effected by an opposed cone friction speed control. Here the bracket 75 terminates in a pulley 78 mounted for lateral movement on a shaft 78A. A belt drive 79 couples the opposed cones 79A in a manner causing the interrotation of the opposed cones at a relative speed proportional to the inverse ratio of the diameter of the cones at the contact point. Thus, as the lever moves back (toward the right) the driven cone 79B moves at a faster speed relative to the driving cone 79C, and resulting in the same speed increase function for the rotor 50 as described in connection with FIG. 9.

Figure 11:
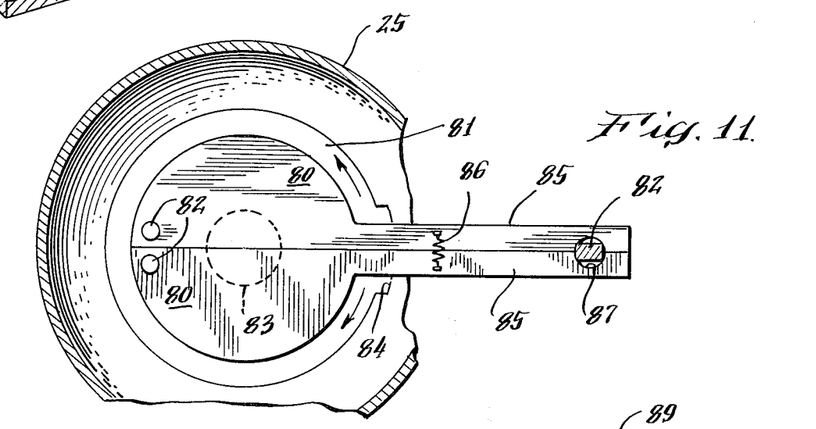
FIG. 11 is a partially cross-sectional top view of a hopper in accordance with a further embodiment of the invention.
Figure 12:
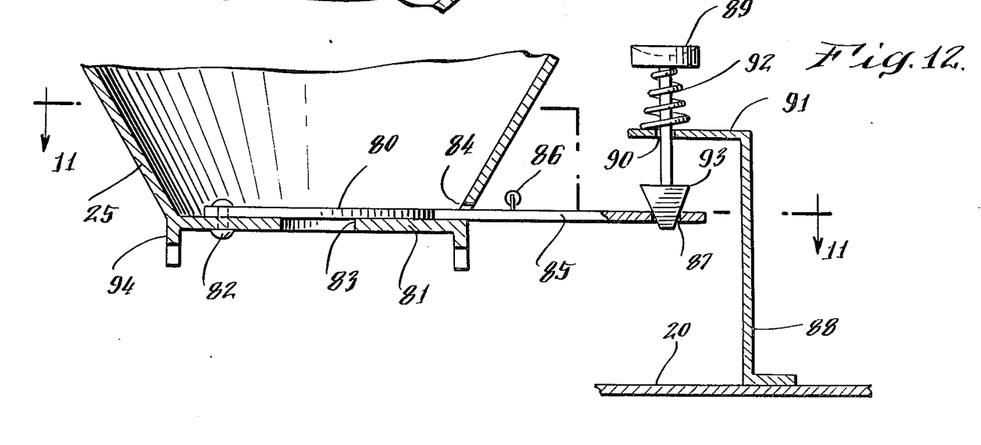
FIG. 12 is a partially cross-sectional view of the hopper control arrangement of FIG. 11, and further illustrating a control for the hopper valve.

In a still further embodiment of the invention, as illustrated in FIGS. 11 and 12, a pair of D-shaped plates 80 may be provided pivoted to the bottom wall 81 of the hopper, at the pivots 82 disposed at one end of each of the D-shaped plates. In a position illustrated in FIG. 11, the straight edges of the D-shaped plates are together, so that the bottom aperture 83 of the hopper 25 is covered. A slot 84 extends to the side of the hopper, and adjacent extensions 85 of the D-shaped plates 80 extend to the slot 84. The ends of the D-shaped plates 80 are resiliently held together, for example, by means of a spring 86 affixed to the extensions 85. A slot 87 is provided, defined by recesses in adjacent surfaces of the extensions 85 externally of the hopper, as illustrated in FIG. 11.

As shown in FIG. 12, a bracket 88 is mounted to the top of the housing 20, and a button 89 is mounted for vertical movement in an aperture 90 and a horizontal extension 91 of the bracket. The top of the button 89 is resiliently urged upwardly by a spring 92 extending between the horizontal extension 91 and the lower surface of the button 89. A conical end 93 is provided on the bottom of the button, below the extension 91, the conical member 85 extending into the slot 87 formed between the extensions 85. The button 89 is mounted adjacent the side of the handle 21 toward the hopper, and adjacent the control 27 as illustrated in FIG. 1, whereby an operator may depress button 89 with a single finger. It will be apparent that, upon depression of the button 89, the conical member 93 effects the separation of the extensions 85, and hence the pivoting of the D-shaped plates 80 about their pivots 82, to uncover the bottom aperture 83 of the hopper to an extent determined by the amount of the button 89 has been depressed. Consequently, the operator may, with a single finger, control the size of an opening through which particulate matter may drop into the distribution chamber.

It will, of course, be apparent that other controls may be employed for controlling the size of the opening through which particulate matter may drop.

In the arrangement illustrated in FIG. 12, the hopper 25 has a downwardly extending rim 94. In this instance, if desired, the hopper may replace the top wall of the distribution chamber, whereby the flange 94 of the hopper may be removably fixed to the outer upper edges of the distribution chamber.

In the alternative arrangement of FIGS. 13 and 14, a straight arm valve is shown coupled in a manner for controlling the flow of particulate material out of the bottom of the hopper 25. The distribution chamber 23 is coupled to the hopper 25 by means of a hollow cuff 95 which may be of a suitable plastic or other type of corrosion resistant material. The arm 96 includes a finger operated segment 97 which, when depressed, acts, through a pivot 98, to open and close the opening 100 in the hopper 25. The pivot 98 may be made relatively stiff in operation so that the arm may be maintained in a desired position when set. In this manner, a variable flow control is achieved.

In operation, an operator fills the hopper 25 to the desired extent, with a particulate material, such as seed, fertilizer, or a particulate chemical. Then, the operator may carry the assembly to the desired location for distribution, and then, by manipulation of the control arm, turn on the motor 30. With his finger the operator also controls the lever to effect the dropping of the particulate material into the distribution chamber, whereby the rotation of the rotor 50 effects the distribution of the material outwardly through the slot 24. It has been found, for example, that material may be distributed for a distance up to about 10 feet through an angle up to about 90° dependent upon the circumferential size of the slot 24. It will, of course, be apparent, that while distributing material, the operator may control the rotation of the motor by means of the control arm to obtain the optimum distribution, and that he may also control a lever from the hopper, in order that the desired amount of material be distributed.

It is further evident that the material is spread from the assembly in a direction away from the operator, since the slot in the distribution chamber is on the side thereof away from the handle 21 by which the assembly is held.

Advantageously, the housing 20, handle 21, unit 22, distribution chamber 23 and hopper 25 may be formed of a plastic material, and these units may be held together by any suitable conventional means.

While the invention has been disclosed and described with reference to a limited number of embodiments, it will be apparent that variations and modifications may be made therein, and it is intended in the following claims to cover each such variation and modification as follows within the true spirit and scope of the invention.

What is claimed is:

1. A portable hand-operated spreader for fine particulate materials, comprising a housing, a handle on top of and affixed to said housing, a distribution chamber having a circular inner cross-section with a vertical axis and mounted on one end of said housing, said chamber having a circumferential slot on the side thereof away from said handle, and at least the central portion of the top of said distribution chamber being open, a motor mounted below said distribution chamber and having a shaft extending upwardly centrally into said distribution chamber, a rotor mounted for rotation with said shaft in said distribution chamber, the top surface of said rotor being substantially flat and aligned with said slot, a plurality of radially extending vanes on said top surface of said rotor, the radially inner ends of said vanes being spaced from the center of said rotor whereby the top surface of said rotor is free of projections in a central region of said top surface of said rotor, said vanes being spaced across said region sufficient to allow particulate material to fall into said region, said region being radially inwardly of and adjacent to said vanes, a hopper mounted above said distribution chamber and having an opening located on said vertical axis for directing material therein downwardly into the center of said distribution chamber and onto said vanes and into said region, valve means for adjusting the flow of material from said hopper into said distribution chamber, first control means positioned at the side of said handle towards said distribution chamber for controlling said motor, and second control means positioned at the side of said handle toward said distribution chamber for controlling said valve means, said first and second control means being positioned with respect to one another at a distance sufficient to enable finger operation by the same hand as is grasping the handle.

2. The spreader of claim 1 wherein said hopper is removably connected to the top of said distribution chamber.

3. The spreader of claim 1 wherein said slot extends through a circumferential distance of from 45° to 90° on said distribution chamber.

4. The spreader of claim 1 wherein said valve means comprises a butterfly valve pivotally mounted in said hopper, said second control means comprising a lever affixed to the shaft of said butterfly vane externally of said hopper and extending adjacent to said side of said handle.

5. The spreader of claim 1 wherein said valve means comprises a pair of D-shaped vanes with facing straight edges and mounted in said hopper in a plane perpendicular to the axis of said hopper and resiliently biased together, the centers of the D-shaped portions of said vanes being substantially axially aligned with said shaft, said vanes further having adjacent extensions from their straight edges extending through the wall of said hopper, said second control means comprising button means mounted adjacent said side of said handle and having a tapered surface resiliently positioned to separate said extensions upon depression of said button means.

6. The spreader of claim 1 wherein said valve means comprises a lever pivotally mounted to said hopper and having a first end inside hopper in a plane perpendicular to the axis of said hopper and said second control means comprising means on the other end of said lever and positioned adjacent said side of said handle for rotating said lever about its pivot.

7. The spreader of claim 1 wherein said first control means comprises a switch mounted on said side of said handle.

8. The spreader of claim 1 further comprising motor control means mounted in said housing for controlling the speed of said motor, and said first control means comprises control means mounted on said side of said handle for controlling said motor control means to vary the speed of said motor.

9. The spreader of claim 1 wherein said housing, distribution chamber, rotor, and hopper are of a plastic material.

10. The spreader of claim 1 wherein said motor is operated by batteries contained within said housing.

11. The spreader of claim 1 wherein said vanes are D-shaped, elevated away from center, and rotate in a direction exposing the flat surface of each D to said particulate material.

12. A portable hand-operated spreader for fine particulate materials, comprising a housing, a handle on top of and affixed to said housing, a distribution chamber having a circular inner cross-section with a vertical axis and mounted on one end of said housing, said chamber having a circumferential slot on the side thereof away from said handle, and at least the central portion of the top of said distribution chamber being open, a motor mounted below said distribution chamber and having a shaft extending upwardly centrally into said distribution chamber, a rotor mounted for rotation with said shaft in said distribution chamber, the top surface of said rotor being substantially flat and aligned with said slot, a plurality of radially extending vanes on said top surface of said rotor, the radially inner ends of said vanes being spaced from the center of said rotor whereby the top surface of said rotor is free of projections at least in an annular region thereof radially inwardly adjacent said vanes, a hopper mounted above said distribution chamber for directing material therein downwardly into the center of said distribution chamber, valve means for adjusting the flow of material from said hopper into said distribution chamber, first control means positioned at the side of said handle towards said distribution chamber for controlling said motor, and second control means positioned at the side of said handle toward said distribution chamber for controlling said valve means, said first and second control means being coupled to a single lever arm, the actions thereof being synchronized thereby.

13. A portable hand-operated spreader for fine particulate materials, comprising a housing, a handle on top of and affixed to said housing, a distribution chamber having a circular inner cross-section with a vertical axis and mounted on one end of said housing, said chamber having a circumferential slot on the side thereof away from said handle, and at least the central portion of the top of said distribution chamber being open, a motor mounted below said distribution chamber and having a shaft extending upwardly centrally into said distribution chamber, a rotor mounted for rotation with said shaft in said distribution chamber, the top surface of said rotor being substantially flat and aligned with said slot, a plurality of radially extending vanes on said top surface of said rotor, the radially inner ends of said vanes being spaced from the center of said rotor whereby the top surface of said rotor is free of projections at least in an annular region thereof radially inwardly adjacent said vanes, a hopper mounted above said distribution chamber for directing material therein downwardly into the center of said distribution chamber, valve means for adjusting the flow of material from said hopper into said distribution chamber, first control means positioned at the side of said handle towards said distribution chamber for controlling said motor, and second control means positioned at the side of said handle toward said distribution chamber for controlling said valve means, said distribution chamber having a removable top wall with a central aperture, and a pair of pin means extending upwardly from said top wall on opposite sides of said central aperture, said hopper having an elliptical aperture at its lower end, the major axis of the elliptical aperture being longer than the maximum distance between the most remote extremeties of said pin means, the minor axis of said elliptical aperture being of a distance to enable locking of said hopper to said pin means at the top of said top wall, whereby said hopper may be removably affixed to the top of said top wall by engagement with said pin means.

14. A particulate material distributor assembly comprising a housing for enclosing a drive, said housing including a handle, a cylindrical distribution chamber and a slot in said chamber directed away from said handle, a motor mounted below said distribution chamber and coupled to a rotor within said chamber, for rotation thereof, said rotor having vanes spaced from the center of the rotor, a hopper removably mounted to the top of said distribution chamber, and a control means for controlling said motor, and for controlling the flow of particulate material from the hopper into said distribution chamber for expellation by said motor vanes through said slot, said control means being coupled to a single lever arm, the actions thereof being synchronized thereby.

* * * * *

UNITED STATES PATENT AND TRADEMARK OFFICE
CERTIFICATE OF CORRECTION

PATENT NO. : 3,993,225
DATED : November 23, 1976
INVENTOR(S) : Mario Manni

It is certified that error appears in the above-identified patent and that said Letters Patent are hereby corrected as shown below:

Column 1, line 28, after "unit" delete ". The" and insert

--, the--.

Column 4, line 15, delete "50" and insert --51--.

Column 6, line 28, omit "of".

Signed and Sealed this

Thirty-first Day of May 1977

[SEAL]

Attest:

RUTH C. MASON
Attesting Officer

C. MARSHALL DANN
Commissioner of Patents and Trademarks